(12) United States Patent
Cooke et al.

(10) Patent No.: US 7,708,470 B2
(45) Date of Patent: May 4, 2010

(54) FERRULE HOLDER AND ASSOCIATED FIBER OPTIC CONNECTOR HAVING ANTI-WITHDRAWAL AND ANTI-ROTATION FEATURES

(75) Inventors: Terry Lee Cooke, Hickory, NC (US); James Phillip Luther, Hickory, NC (US); Joel Christopher Rosson, Hickory, NC (US); Jillcha Fekadu Wakjira, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/726,185

(22) Filed: Mar. 21, 2007

(65) Prior Publication Data
US 2008/0232742 A1 Sep. 25, 2008

(51) Int. Cl.
*G02B 6/36* (2006.01)
(52) U.S. Cl. .......................................... 385/78; 385/77
(58) Field of Classification Search .................... 385/80, 385/60, 78, 66, 84, 137, 139, 77
See application file for complete search history.

(56) References Cited

U.S. PATENT DOCUMENTS

| | | | |
|---|---|---|---|
| 4,880,290 A | 11/1989 | Kumazawa et al. | 350/96.2 |
| 5,071,218 A | 12/1991 | Nishimoto | 385/60 |
| 5,381,497 A * | 1/1995 | Toland et al. | 385/80 |
| 5,428,699 A | 6/1995 | Pon | |
| 5,436,994 A | 7/1995 | Ott et al. | 385/86 |
| 2005/0244108 A1 | 11/2005 | Billman et al. | 385/60 |

FOREIGN PATENT DOCUMENTS

| | | |
|---|---|---|
| JP | 60-108804 | 6/1985 |
| JP | 60-150009 | 8/1985 |
| JP | 10-155806 | 6/1998 |

OTHER PUBLICATIONS

Patent Cooperation Treaty, International Search Report for International Application No. PCT/US2008/003569, Jul. 8, 2008, 3 pages.

\* cited by examiner

*Primary Examiner*—Uyen-Chau N Le
*Assistant Examiner*—Rhonda S Peace

(57) ABSTRACT

The present invention relates generally to ferrule holders and associated fiber optic connectors used in optical communications networks, optical devices, and the like to optically couple optical fibers. More specifically, the present invention relates to a ferrule holder and an associated fiber optic connector having improved anti-withdrawal and anti-rotation features, such as a twin-threaded configuration, a single-threaded configuration, a splined configuration, a broached configuration, a counter-bored configuration, a dented configuration, a finned configuration, etc. These anti-withdrawal and anti-rotation features assist in holding an optical fiber in secure optical and/or physical contact with a ferrule within the ferrule holder and associated fiber optic connector.

10 Claims, 7 Drawing Sheets

FERRULE HOLDER AND ASSOCIATED FIBER OPTIC CONNECTOR HAVING ANTI-WITHDRAWAL AND ANTI-ROTATION FEATURES

BACKGROUND OF THE INVENTION

1. Field of the Invention

The present invention relates generally to ferrule holders and associated fiber optic connectors used in optical communications networks, optical devices, and the like to optically couple optical fibers. More specifically, the present invention relates to a ferrule holder and an associated fiber optic connector having improved anti-withdrawal and anti-rotation features, such as a twin-threaded configuration, a single-threaded configuration, a splined configuration, a broached configuration, a counter-bored configuration, a dented configuration, a finned configuration, etc. These anti-withdrawal and anti-rotation features assist in holding an optical fiber in secure optical and/or physical contact with a ferrule within the ferrule holder and associated fiber optic connector.

2. Technical Background of the Invention

A conventional fiber optic connector includes, among other parts, an outer housing, an alignment sleeve, an inner structure that is configured to retain an optical fiber cable, a heat shrink and/or boot that is/are configured to retain and protect the optical fiber cable, and a ferrule holder that is configured to hold a ferrule. This ferrule is in optical and/or physical contact with an optical fiber that typically enters the ferrule holder opposite the ferrule. In operation, the fiber optic connector is mated with another fiber optic connector, such as a plug with a receptacle, for example, bringing the corresponding ferrules into optical and/or physical contact. This, of course, brings the corresponding optical fibers into optical contact, thereby creating an optical connection. The ferrules may be single or multi-fiber ferrules. The ferrule holders holding these ferrules may assume a variety of shapes, but are typically substantially cylindrical, and are manufactured from a metallic material or plastic material, due to the fact that such materials are relatively easy to machine or cast.

The optical fiber that enters the ferrule holder opposite the ferrule is typically secured in the ferrule holder and to the ferrule using an adhesive, preventing withdrawal and rotation of the optical fiber in relation to the ferrule holder and the ferrule. One major problem that the fiber optic industry currently struggles with, however, is that of delamination of the adhesive, caused by the poor bonding that exists between an optical fiber and a metallic material ferrule holder, for example. In addition, the adhesive used is prone to shrinking and detaching from the underlying substrate.

A variety of techniques have been developed to deal with the problems described above, including the use of various mechanical anchoring mechanisms and adhesive compositions. None of these techniques, however, provide adequate anti-withdrawal and anti-rotation characteristics. The techniques fail existing pull and twist tests in the face of the delamination and shrinkage problems described above. Thus, what is still needed in the art is a ferrule holder and associated fiber optic connector having improved anti-withdrawal and anti-rotation features.

BRIEF SUMMARY OF THE INVENTION

In various embodiments, the present invention provides a ferrule holder and associated fiber optic connector having improved anti-withdrawal and anti-rotation features, such as a twin-threaded configuration, a single-threaded configuration, a splined configuration, a broached configuration, a counter-bored configuration, a dented configuration, a finned configuration, etc. These anti-withdrawal and anti-rotation features assist in holding an optical fiber in secure optical and/or physical contact with a ferrule within the ferrule holder and associated fiber optic connector.

In one embodiment, the present invention provides a ferrule holder for use in a fiber optic connector or the like, including: a first end portion defining a bore that is configured and sized to receive an optical fiber; a second end portion defining a bore that is configured and sized to receive a ferrule; and a center portion defining a bore that is configured and sized to receive the optical fiber disposed between the first end portion and the second end portion, wherein an inside surface of the center portion includes an anti-withdrawal and anti-rotation geometry for holding the optical fiber in secure optical and/or physical contact with the ferrule. The anti-withdrawal and anti-rotation geometry includes a structure selected from the group consisting of a twin thread, a single thread, a spline, a broach, a counter-bore, a dent, one or more fins, and a combination thereof. The ferrule holder also includes an adhesive disposed on the inside surface of the center portion for holding the optical fiber in secure optical and/or physical contact with the ferrule.

In another embodiment, the present invention provides a device for use in a fiber optic connector or the like, including: a first end portion defining a bore that is configured and sized to receive a first optical fiber; a second end portion defining a bore that is configured and sized to receive a second optical fiber; and a center portion defining a bore that is configured and sized to receive the first optical fiber disposed between the first end portion and the second end portion, wherein an inside surface of the center portion includes an anti-withdrawal and anti-rotation geometry for holding the first optical fiber in secure optical and/or physical contact with the second optical fiber. Again, the anti-withdrawal and anti-rotation geometry includes a structure selected from the group consisting of a twin thread, a single thread, a spline, a broach, a counter-bore, a dent, one or more fins, and a combination thereof. The device also includes an adhesive disposed on the inside surface of the center portion for holding the first optical fiber in secure optical and/or physical contact with the second optical fiber.

In a further embodiment, the present invention provides a fiber optic connector including a ferrule holder, including: a first end portion defining a bore that is configured and sized to receive an optical fiber; a second end portion defining a bore that is configured and sized to receive a ferrule; and a center portion defining a bore that is configured and sized to receive the optical fiber disposed between the first end portion and the second end portion, wherein an inside surface of the center portion includes an anti-withdrawal and anti-rotation geometry for holding the optical fiber in secure optical and/or physical contact with the ferrule. The anti-withdrawal and anti-rotation geometry includes a structure selected from the group consisting of a twin thread, a single thread, a spline, a broach, a counter-bore, a dent, one or more fins, and a combination thereof. The fiber optic connector also includes an adhesive disposed on the inside surface of the center portion for holding the optical fiber in secure optical and/or physical contact with the ferrule.

It is to be understood that both the foregoing general description and the following detailed description provide exemplary embodiments of the present invention, and an overview or framework for understanding the nature and character of the present invention as it is claimed. The accompanying drawings are included in order to provide a further understanding of the present invention, and are incorporated into and constitute a part of this specification. The accompanying drawings illustrate the various exemplary embodiments of the present invention, and together with the detailed description, serve to explain the principles of operation thereof. The accompanying drawings are meant to be illustrative, and not limiting.

BRIEF DESCRIPTION OF THE DRAWINGS

The present invention is illustrated and described herein with reference to the various drawings, in which like reference numbers are used to denote like method steps and/or device components, as appropriate, and in which.

DETAILED DESCRIPTION OF THE INVENTION

In various embodiments, the present invention provides a ferrule holder and associated fiber optic connector having improved anti-withdrawal and anti-rotation features, such as a twin-threaded configuration, a single-threaded configuration, a splined configuration, a broached configuration, a counter-bored configuration, a dented configuration, a finned configuration, etc. These anti-withdrawal and anti-rotation features assist in holding an optical fiber in secure optical and/or physical contact with a ferrule within the ferrule holder and associated fiber optic connector.

Figure 1:
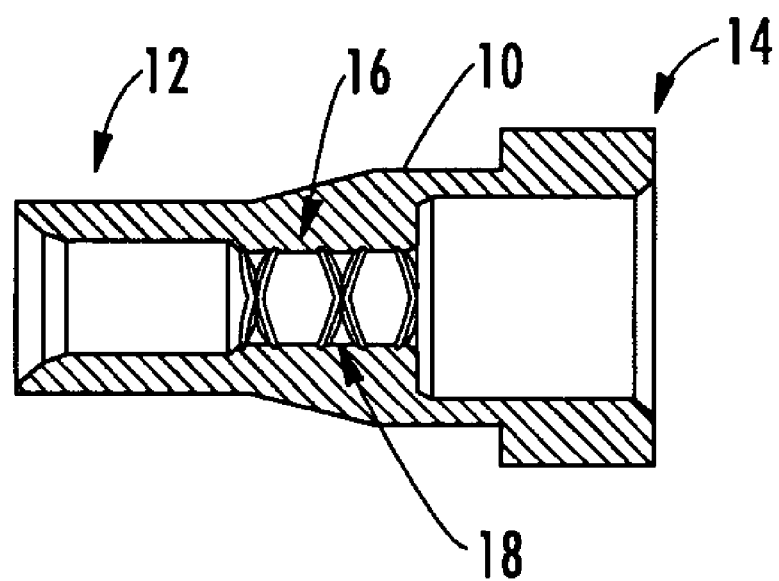
FIG. 1 is a planar side view illustrating one embodiment of the ferrule holder of the present invention, specifically the ferrule holder having a twin-threaded configuration.

Referring to FIG. 1, in one embodiment, the ferrule holder 10 of the present invention includes a first end 12 including a bore that is configured and sized to receive an optical fiber (not illustrated) and a second end 14 including a bore that is configured and sized to receive a ferrule (not illustrated). The first end 12 including the bore that is configured and sized to receive the optical fiber is substantially cylindrical, in the event that a single optical fiber is used, or substantially rectangular, in the event that multiple optical fibers are used. Similarly, the second end 14 including the bore that is configured and sized to receive the ferrule is substantially cylindrical, in the event that a single-fiber ferrule is used, or substantially rectangular, in the event that a multi-fiber ferrule is used. It should be noted that any suitable shapes may be used. In this embodiment, the outside and inside diameters of the first end 12 including the bore that is configured and sized to receive the optical fiber are substantially smaller than the outside and inside diameters of the second end 14 including the bore that is configured and sized to receive the ferrule. As described above, the ferrule holder 10 is manufactured from a metallic material, plastic material, or the like. A retention bore 16 is disposed between the bores of the first end 12 and the second end 14 of the ferrule holder 10. This retention bore 16 is configured to receive and retain the optical fiber, holding it in optical and/or physical contact with the ferrule. In this embodiment, the retention bore 16 includes twin threads 18 manufactured into its inside surface. These twin threads 18 physically enhance the anti-withdrawal and anti-rotation characteristics of the retention bore 16, acting as an anchor, as well as provide additional surface area for an adhesive (not illustrated) disposed between the optical fiber and the retention bore 16 to adhere to, if used, effectively eliminating delamination and shrinkage problems. Alternatively, a plurality of retention bores 16 each include twin threads 18 manufactured into their inside surfaces. Again, these twin threads 18 physically enhance the anti-withdrawal and anti-rotation characteristics of the retention bores 16, acting as anchors, as well as provide additional surface area for an adhesive disposed between the optical fiber and the retention bores 16 to adhere to, if used. This twin-threaded configuration allows the ferrule holder 10 to pass existing pull and twist tests, as the adhesive-fiber-matrix is effectively strengthened. Thus, robust optical contact between the optical fiber and the ferrule is ensured, even in the face of destructives forces applied to the optical fiber.

Figure 2:
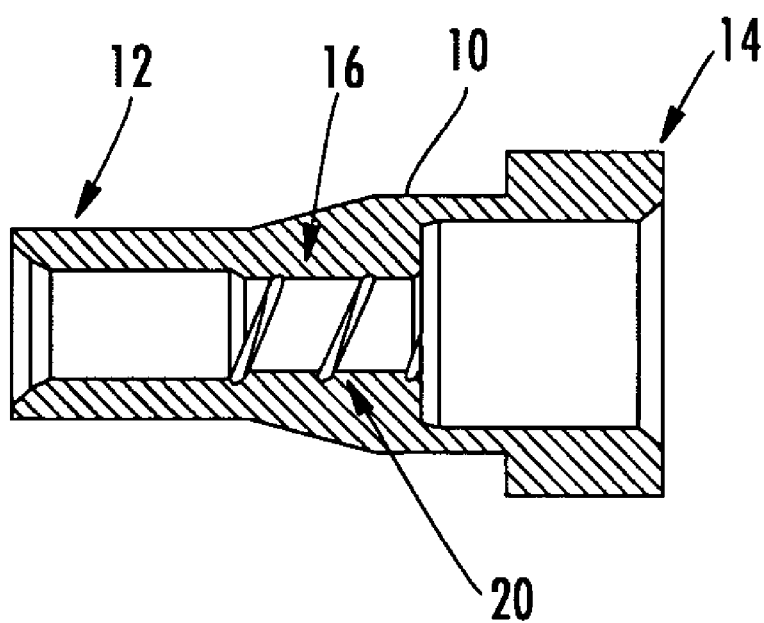
FIG. 2 is a planar side view illustrating another embodiment of the ferrule holder of the present invention, specifically the ferrule holder having a single-threaded configuration.

Referring to FIG. 2, in another embodiment, the ferrule holder 10 of the present invention includes a first end 12 including a bore that is configured and sized to receive an optical fiber (not illustrated) and a second end 14 including a bore that is configured and sized to receive a ferrule (not illustrated). The first end 12 including the bore that is configured and sized to receive the optical fiber is substantially cylindrical, in the event that a single optical fiber is used, or substantially rectangular, in the event that multiple optical fibers are used. Similarly, the second end 14 including the bore that is configured and sized to receive the ferrule is substantially cylindrical, in the event that a single-fiber ferrule is used, or substantially rectangular, in the event that a multi-fiber ferrule is used. It should be noted that any suitable shapes may be used. In this embodiment, the outside and inside diameters of the first end 12 including the bore that is configured and sized to receive the optical fiber are substantially smaller than the outside and inside diameters of the second end 14 including the bore that is configured and sized to receive the ferrule. As described above, the ferrule holder 10 is manufactured from a metallic material, plastic material, or the like. A retention bore 16 is disposed between the bores of the first end 12 and the second end 14 of the ferrule holder 10. This retention bore 16 is configured to receive and retain the optical fiber, holding it in optical and/or physical contact with the ferrule. In this embodiment, the retention bore 16 includes a single thread 20 manufactured into its inside surface. This single thread 20 physically enhances the anti-withdrawal and anti-rotation characteristics of the retention bore 16, acting as an anchor, as well as provides additional surface area for an adhesive (not illustrated) disposed between the optical fiber and the retention bore 16 to adhere to, if used, effectively eliminating delamination and shrinkage problems. Alternatively, a plurality of retention bores 16 each include a single thread 20 manufactured into their inside surfaces. Again, this single thread 20 physically enhances the anti-withdrawal and anti-rotation characteristics of the retention bores 16, acting as anchors, as well as provides additional surface area for an adhesive disposed between the optical fiber and the retention bores 16 to adhere to, if used. This single-threaded configuration allows the ferrule holder 10 to pass existing pull and twist tests, as the adhesive-fiber-matrix is effectively strengthened. Thus, robust optical contact between the optical fiber and the ferrule is ensured, even in the face of destructives forces applied to the optical fiber.

Figure 3:
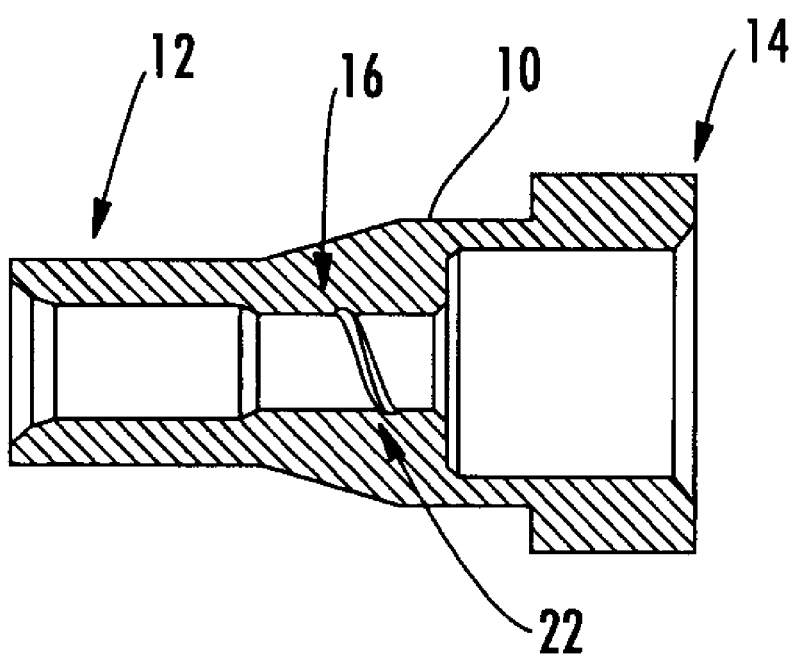
FIG. 3 is a planar side view illustrating a further embodiment of the ferrule holder of the present invention, specifically the ferrule holder having a splined configuration.

Referring to FIG. 3, in a further embodiment, the ferrule holder 10 of the present invention includes a first end 12 including a bore that is configured and sized to receive an optical fiber (not illustrated) and a second end 14 including a bore that is configured and sized to receive a ferrule (not illustrated). The first end 12 including the bore that is configured and sized to receive the optical fiber is substantially cylindrical, in the event that a single optical fiber is used, or substantially rectangular, in the event that multiple optical fibers are used. Similarly, the second end 14 including the bore that is configured and sized to receive the ferrule is substantially cylindrical, in the event that a single-fiber ferrule is used, or substantially rectangular, in the event that a multi-fiber ferrule is used. It should be noted that any suitable shapes may be used. In this embodiment, the outside and inside diameters of the first end 12 including the bore that is configured and sized to receive the optical fiber are substantially smaller than the outside and inside diameters of the second end 14 including the bore that is configured and sized to receive the ferrule. As described above, the ferrule holder 10 is manufactured from a metallic material, plastic material, or the like. A retention bore 16 is disposed between the bores of the first end 12 and the second end 14 of the ferrule holder 10. This retention bore 16 is configured to receive and retain the optical fiber, holding it in optical and/or physical contact with the ferrule. In this embodiment, the retention bore 16 includes a spline 22 manufactured into its inside surface. This spline 22 physically enhance the anti-withdrawal and anti-rotation characteristics of the retention bore 16, acting as an anchor, as well as provides additional surface area for an adhesive (not illustrated) disposed between the optical fiber and the retention bore 16 to adhere to, if used, effectively eliminating delamination and shrinkage problems. Alternatively, a plurality of retention bores 16 each include a spline 22 manufactured into their inside surfaces. Again, this spline 22 physically enhances the anti-withdrawal and anti-rotation characteristics of the retention bores 16, acting as anchors, as well as provides additional surface area for an adhesive disposed between the optical fiber and the retention bores 16 to adhere to, if used. This splined configuration allows the ferrule holder 10 to pass existing pull and twist tests, as the adhesive-fiber-matrix is effectively strengthened. Thus, robust optical contact between the optical fiber and the ferrule is ensured, even in the face of destructives forces applied to the optical fiber.

Figure 4:
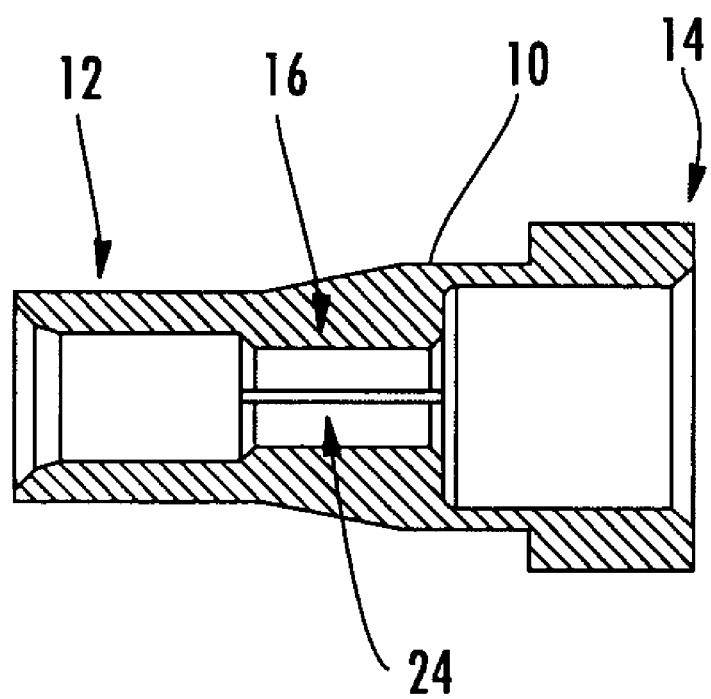
FIG. 4 is a planar side view illustrating a still further embodiment of the ferrule holder of the present invention, specifically the ferrule holder having a broached configuration.

Referring to FIG. 4, in a still further embodiment, the ferrule holder 10 of the present invention includes a first end 12 including a bore that is configured and sized to receive an optical fiber (not illustrated) and a second end 14 including a bore that is configured and sized to receive a ferrule (not illustrated). The first end 12 including the bore that is configured and sized to receive the optical fiber is substantially cylindrical, in the event that a single optical fiber is used, or substantially rectangular, in the event that multiple optical fibers are used. Similarly, the second end 14 including the bore that is configured and sized to receive the ferrule is substantially cylindrical, in the event that a single-fiber ferrule is used, or substantially rectangular, in the event that a multi-fiber ferrule is used. It should be noted that any suitable shapes may be used. In this embodiment, the outside and inside diameters of the first end 12 including the bore that is configured and sized to receive the optical fiber are substantially smaller than the outside and inside diameters of the second end 14 including the bore that is configured and sized to receive the ferrule. As described above, the ferrule holder 10 is manufactured from a metallic material, plastic material, or the like. A retention bore 16 is disposed between the bores of the first end 12 and the second end 14 of the ferrule holder 10. This retention bore 16 is configured to receive and retain the optical fiber, holding it in optical and/or physical contact with the ferrule. In this embodiment, the retention bore 16 includes a broach 24 manufactured into its inside surface. This broach 24 physically enhances the anti-withdrawal and anti-rotation characteristics of the retention bore 16, acting as an anchor, as well as provides additional surface area for an adhesive (not illustrated) disposed between the optical fiber and the retention bore 16 to adhere to, if used, effectively eliminating delamination and shrinkage problems. The broach 24 may vary in length and depth, as appropriate. For example, the broach 24 may run the entire length of the retention bore 16, or only a small portion of the length of the retention bore 16. Alternatively, a plurality of retention bores 16 each include a broach 24 manufactured into their inside surfaces. Again, this broach 24 physically enhances the anti-withdrawal and anti-rotation characteristics of the retention bores 16, acting as anchors, as well as provides additional surface area for an adhesive disposed between the optical fiber and the retention bores 16 to adhere to, if used. This broached configuration allows the ferrule holder 10 to pass existing pull and twist tests, as the adhesive-fiber-matrix is effectively strengthened. Thus, robust optical contact between the optical fiber and the ferrule is ensured, even in the face of destructives forces applied to the optical fiber.

Figure 5:
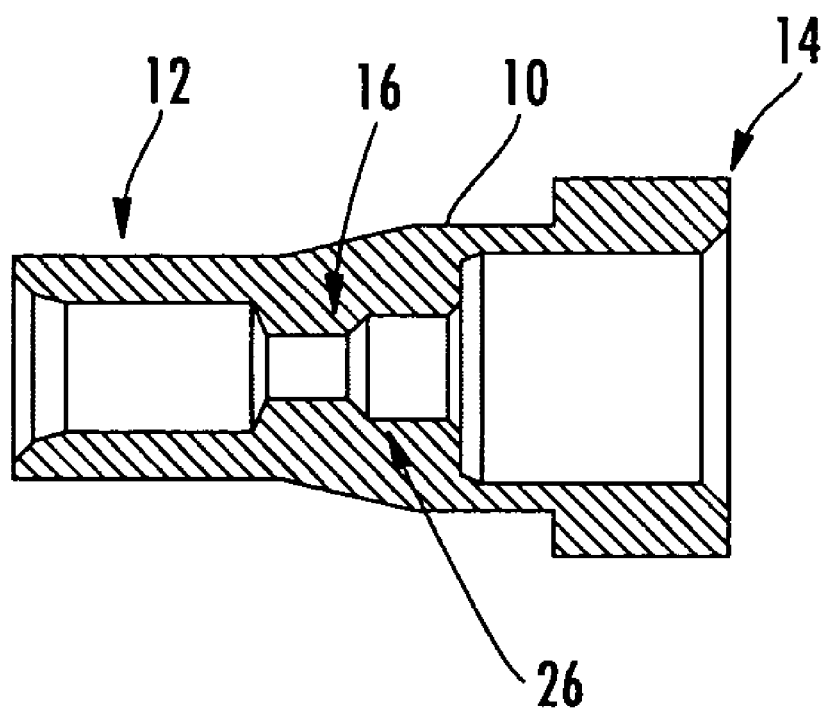
FIG. 5 is a planar side view illustrating a still further embodiment of the ferrule holder of the present invention, specifically the ferrule holder having a counter-bored configuration.

Referring to FIG. 5, in a still further embodiment, the ferrule holder 10 of the present invention includes a first end 12 including a bore that is configured and sized to receive an optical fiber (not illustrated) and a second end 14 including a bore that is configured and sized to receive a ferrule (not illustrated). The first end 12 including the bore that is configured and sized to receive the optical fiber is substantially cylindrical, in the event that a single optical fiber is used, or substantially rectangular, in the event that multiple optical fibers are used. Similarly, the second end 14 including the bore that is configured and sized to receive the ferrule is substantially cylindrical, in the event that a single-fiber ferrule is used, or substantially rectangular, in the event that a multi-fiber ferrule is used. It should be noted that any suitable shapes may be used. In this embodiment, the outside and inside diameters of the first end 12 including the bore that is configured and sized to receive the optical fiber are substantially smaller than the outside and inside diameters of the second end 14 including the bore that is configured and sized to receive the ferrule. As described above, the ferrule holder 10 is manufactured from a metallic material, plastic material, or the like. A retention bore 16 is disposed between the bores of the first end 12 and the second end 14 of the ferrule holder 10. This retention bore 16 is configured to receive and retain the optical fiber, holding it in optical and/or physical contact with the ferrule. In this embodiment, the retention bore 16 includes a counter-bore 26 manufactured into its inside surface. This counter-bore 26 physically enhances the anti-withdrawal and anti-rotation characteristics of the retention bore 16, acting as an anchor, as well as provides additional surface area for an adhesive (not illustrated) disposed between the optical fiber and the retention bore 16 to adhere to, if used, effectively eliminating delamination and shrinkage problems. Alternatively, a plurality of retention bores 16 each include a counter-bore 26 manufactured into their inside surfaces. Again, this counter-bore 26 physically enhances the anti-withdrawal and anti-rotation characteristics of the retention bores 16, acting as anchors, as well as provides additional surface area for an adhesive disposed between the optical fiber and the retention bores 16 to adhere to, if used. This counter-bored configuration allows the ferrule holder 10 to pass existing pull and twist tests, as the adhesive-fiber-matrix is effectively strengthened. Thus, robust optical contact between the optical fiber and the ferrule is ensured, even in the face of destructives forces applied to the optical fiber.

Figure 6:
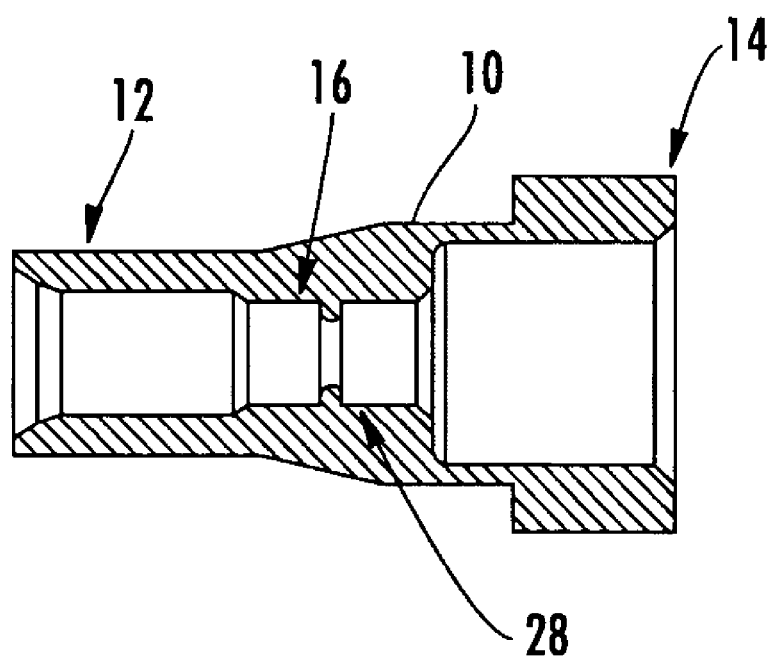
FIG. 6 is a planar side view illustrating a still further embodiment of the ferrule holder of the present invention, specifically the ferrule holder having a dented configuration.

Referring to FIG. 6, in a still further embodiment, the ferrule holder 10 of the present invention includes a first end 12 including a bore that is configured and sized to receive an optical fiber (not illustrated) and a second end 14 including a bore that is configured and sized to receive a ferrule (not illustrated). The first end 12 including the bore that is configured and sized to receive the optical fiber is substantially cylindrical, in the event that a single optical fiber is used, or substantially rectangular, in the event that multiple optical fibers are used. Similarly, the second end 14 including the bore that is configured and sized to receive the ferrule is substantially cylindrical, in the event that a single-fiber ferrule is used, or substantially rectangular, in the event that a multi-fiber ferrule is used. It should be noted that any suitable shapes may be used. In this embodiment, the outside and inside diameters of the first end 12 including the bore that is configured and sized to receive the optical fiber are substantially smaller than the outside and inside diameters of the second end 14 including the bore that is configured and sized to receive the ferrule. As described above, the ferrule holder 10 is manufactured from a metallic material, plastic material, or the like. A retention bore 16 is disposed between the bores of the first end 12 and the second end 14 of the ferrule holder 10. This retention bore 16 is configured to receive and retain the optical fiber, holding it in optical and/or physical contact with the ferrule. In this embodiment, the retention bore 16 includes a dent 28 manufactured into its inside surface. This dent 28 physically enhances the anti-withdrawal and anti-rotation characteristics of the retention bore 16, acting as an anchor, as well as provides additional surface area for an adhesive (not illustrated) disposed between the optical fiber and the retention bore 16 to adhere to, if used, effectively eliminating delamination and shrinkage problems. Alternatively, a plurality of retention bores 16 each include a dent 28 manufactured into their inside surfaces. Again, this dent 28 physically enhances the anti-withdrawal and anti-rotation characteristics of the retention bores 16, acting as anchors, as well as provides additional surface area for an adhesive disposed between the optical fiber and the retention bores 16 to adhere to, if used. This dented configuration allows the ferrule holder 10 to pass existing pull and twist tests, as the adhesive-fiber-matrix is effectively strengthened. Thus, robust optical contact between the optical fiber and the ferrule is ensured, even in the face of destructives forces applied to the optical fiber.

Figure 7:
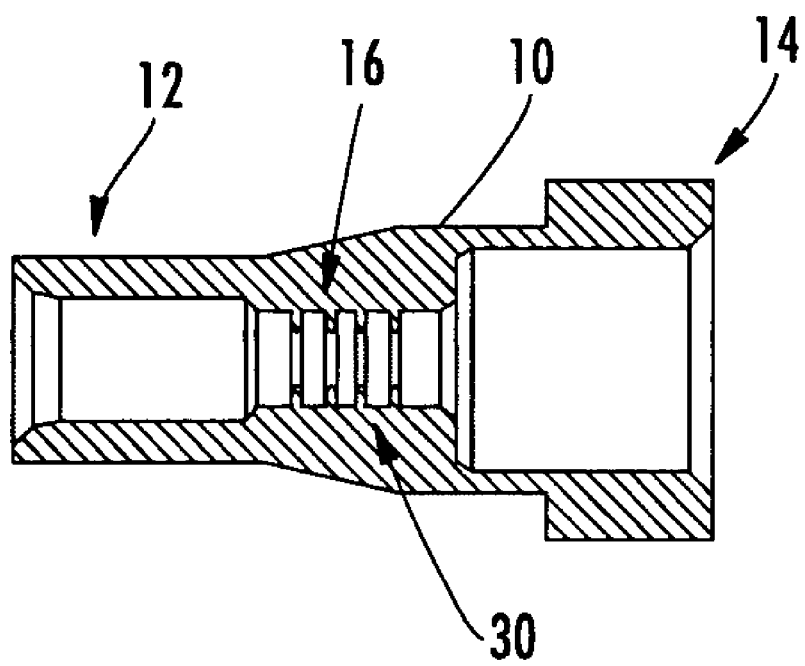
FIG. 7 is a planar side view illustrating a still further embodiment of the ferrule holder of the present invention, specifically the ferrule holder having a finned configuration.

Referring to FIG. 7, in a still further embodiment, the ferrule holder 10 of the present invention includes a first end 12 including a bore that is configured and sized to receive an optical fiber (not illustrated) and a second end 14 including a bore that is configured and sized to receive a ferrule (not illustrated). The first end 12 including the bore that is configured and sized to receive the optical fiber is substantially cylindrical, in the event that a single optical fiber is used, or substantially rectangular, in the event that multiple optical fibers are used. Similarly, the second end 14 including the bore that is configured and sized to receive the ferrule is substantially cylindrical, in the event that a single-fiber ferrule is used, or substantially rectangular, in the event that a multi-fiber ferrule is used. It should be noted that any suitable shapes may be used. In this embodiment, the outside and inside diameters of the first end 12 including the bore that is configured and sized to receive the optical fiber are substantially smaller than the outside and inside diameters of the second end 14 including the bore that is configured and sized to receive the ferrule. As described above, the ferrule holder 10 is manufactured from a metallic material, plastic material, or the like. A retention bore 16 is disposed between the bores of the first end 12 and the second end 14 of the ferrule holder 10. This retention bore 16 is configured to receive and retain the optical fiber, holding it in optical and/or physical contact with the ferrule. In this embodiment, the retention bore 16 includes one or more non-intersecting and non-conjoined fins 30 manufactured into its inside surface. These one or more fins 30 physically enhance the anti-withdrawal and anti-rotation characteristics of the retention bore 16, acting as an anchor, as well as provide additional surface area for an adhesive (not illustrated) disposed between the optical fiber and the retention bore 16 to adhere to, if used, effectively eliminating delamination and shrinkage problems. Alternatively, a plurality of retention bores 16 each include one or more fins 30 manufactured into their inside surfaces. Again, these one or more fins 30 physically enhance the anti-withdrawal and anti-rotation characteristics of the retention bores 16, acting as anchors, as well as provide additional surface area for an adhesive disposed between the optical fiber and the retention bores 16 to adhere to, if used. This finned configuration allows the ferrule holder 10 to pass existing pull and twist tests, as the adhesive-fiber-matrix is effectively strengthened. Thus, robust optical contact between the optical fiber and the ferrule is ensured, even in the face of destructives forces applied to the optical fiber.

It should be noted that any suitable anti-withdrawal and anti-rotation geometry is with respect to the retention bore(s) 16 (FIGS. 1-7) is contemplated by the present invention. Likewise, the present invention is not limited in its application to a ferrule holder 10 (FIGS. 1-7). It may be applied variously to any housing that is used to hold an optical fiber during fiber optic connector assembly, for example. Both ceramic and non-ceramic ferrules are contemplated by the present invention.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A ferrule holder for a fiber optic connector, comprising:
a first end portion defining a bore that is configured and sized to receive an optical fiber;
a second end portion defining a bore that is configured and sized to receive a ferrule; and
a center portion defining a bore that is configured and sized to receive the optical fiber disposed between the first end portion and the second end portion, wherein an inside surface of the center portion comprises an anti-withdrawal and anti-rotation geometry for holding the optical fiber in secure optical and/or physical contact with the ferrule, wherein the anti-withdrawal and anti-rotation geometry does not extend to an outer end of the second end portion.

2. The ferrule holder of claim 1, wherein the anti-withdrawal and anti-rotation geometry comprises a structure selected from the group consisting of a twin thread, a single thread, a spline, a broach, a counter-bore, a dent, one or more fins, and a combination thereof.

3. The ferrule holder of claim 1, further comprising an adhesive disposed on the inside surface of the center portion for holding the optical fiber in secure optical and/or physical contact with the ferrule.

4. The ferrule holder of claim 1, wherein the ferrule holder comprises one of a metallic material and a plastic material.

5. The ferrule holder of claim 1, wherein the second end portion bore includes an inside bore diameter that is greater than an inside bore diameter of the center portion bore.

6. A fiber optic connector, comprising:
a ferrule holder, comprising:
a first end portion defining a bore that is configured and sized to receive an optical fiber;
a second end portion defining a bore that is configured and sized to receive a ferrule; and
a center portion defining a bore that is configured and sized to receive the optical fiber disposed between the first end portion and the second end portion, wherein an inside surface of the center portion comprises an anti-withdrawal and anti-rotation geometry for holding the optical fiber in secure optical and/or physical contact with the ferrule, and wherein the second end portion bore includes an inside bore diameter that is greater than an inside bore diameter of the center portion bore.

7. The fiber optic connector of claim 6, wherein the anti withdrawal and anti-rotation geometry comprises a structure selected from the group consisting of a twin thread, a single thread, a spline, a broach, a counter-bore, a dent, one or more fins, and a combination thereof.

8. The fiber optic connector of claim 6, further comprising an adhesive disposed on the inside surface of the center portion for holding the optical fiber in secure optical and/or physical contact with the ferrule.

9. The fiber optic connector of claim 6, wherein the ferrule holder comprises one of a metallic material and a plastic material.

10. The fiber optic connector of claim 6, wherein the anti-withdrawal and anti-rotation geometry does not extend to an outer end of the second end portion.

* * * * *